United States Patent [19]
Ozaki et al.

[11] Patent Number: 5,864,724
[45] Date of Patent: Jan. 26, 1999

[54] DATA PRINTING DEVICE FOR CAMERA

[75] Inventors: Hiroyasu Ozaki; Shigeru Morishita; Kazunori Takahashi, all of Tokyo, Japan

[73] Assignee: Asahi Kogaku Kogyo Kabushiki Kaisha, Tokyo, Japan

[21] Appl. No.: 814,465

[22] Filed: Mar. 10, 1997

[30] Foreign Application Priority Data

Mar. 15, 1996 [JP] Japan ................................ 8-087348

[51] Int. Cl.⁶ .................................................. G03B 17/24
[52] U.S. Cl. ........................ 396/310; 396/315; 396/317
[58] Field of Search .................................. 396/310, 315, 396/317

[56] References Cited

U.S. PATENT DOCUMENTS

| | | | |
|---|---|---|---|
| 4,268,143 | 5/1981 | Dearing et al. | 296/315 |
| 4,511,229 | 4/1985 | Schwartz et al. | 396/310 |
| 4,987,434 | 1/1991 | Soshi et al. | |
| 5,003,329 | 3/1991 | Itabashi | |
| 5,028,942 | 7/1991 | Kirigaya | |
| 5,471,266 | 11/1995 | Satou | |
| 5,678,084 | 10/1997 | Hori | 396/317 |

*Primary Examiner*—Russell Adams
*Attorney, Agent, or Firm*—Greenblum & Bernstein, P.L.C.

[57] ABSTRACT

A data printing device comprises a light emitting device that includes a plurality of light emitting elements, and an imaging optical system for forming light points on the film which correspond to the light emitting elements. The imaging optical system includes at least one imaging lens and at least three reflecting surfaces that reflect the light from the light emitting device to bend the optical path along an arc of a cylindrical wall of a film space, such as a spool chamber or a cartridge chamber.

17 Claims, 3 Drawing Sheets

DATA PRINTING DEVICE FOR CAMERA

BACKGROUND OF THE INVENTION

The present invention relates to a data printing device used in a camera to print data such as date and/or time on a frame of a roll of film.

A conventional data printing device includes a light emitting device and an imaging optical system. The light emitting device includes a plurality of LEDs (light emitting diodes) aligned along a line perpendicular to a winding direction of a roll of film and the imaging optical system forms light points corresponding to the LEDs on the film. The LEDs are controlled in synchronism with winding of the roll of film to print data, such as a date, as a dot matrix image.

This type of data printing device is generally located such that the printing on the film occurs between an aperture, through which the film is exposed, and a spool chamber, into which the film is wound. That is, the printing occurs at a position that is downstream of the photographing position along the film winding direction, since the data is printed on the exposed frame after exposure (photographing). Thus, the data printing device, and in particular the imaging optical system, must be arranged between a photographing optical path, leading from a photographing lens through the aperture, and the spool chamber.

There are three types of imaging optical systems used in conventional data printing devices. The first type of imaging optical system uses a straight optical path between the light emitting device and the film. Thus, this imaging optical system has no reflecting surfaces. The second type of imaging optical system includes a single reflecting surface to reflect a light from the light emitting device through a right angle (90 degrees) toward the film. The third type of imaging optical system includes two reflecting surfaces that are parallel to each other such that light from the light emitting device is shifted parallel to the direction of travel in the path to the film.

However, the conventional data printing devices described above require a relatively large clearance between the photographing optical path and the spool chamber.

SUMMARY OF THE INVENTION

It is therefore an object of the present invention to provide a data printing device that allows the clearance between a photographing optical path and a spool chamber to be reduced in order to make a camera more compact.

In order to achieve the object of the invention, a data printing device comprises a light emitting device that includes a plurality of light emitting points, and an imaging optical system for forming light points corresponding to the light emitting points on a film, the imaging optical system including at least one imaging lens and at least three reflecting surfaces that reflect the light from the light emitting device to form a bent optical path along an arc of a cylindrical wall.

The imaging optical system may comprise four reflecting surfaces. In a case where the imaging optical system includes a pair of imaging lenses, each of the lenses may be provided with a pair of total internal reflecting surfaces. Preferably, each pair of the total internal reflecting surfaces are parallel to each other. Further, one of the pair of the reflecting surfaces shift the optical path in one direction and the other pair of the total internal reflecting surfaces shift the optical path in the opposite direction.

DETAILED DESCRIPTION OF THE PREFERRED EMBODIMENTS

Figure 1:
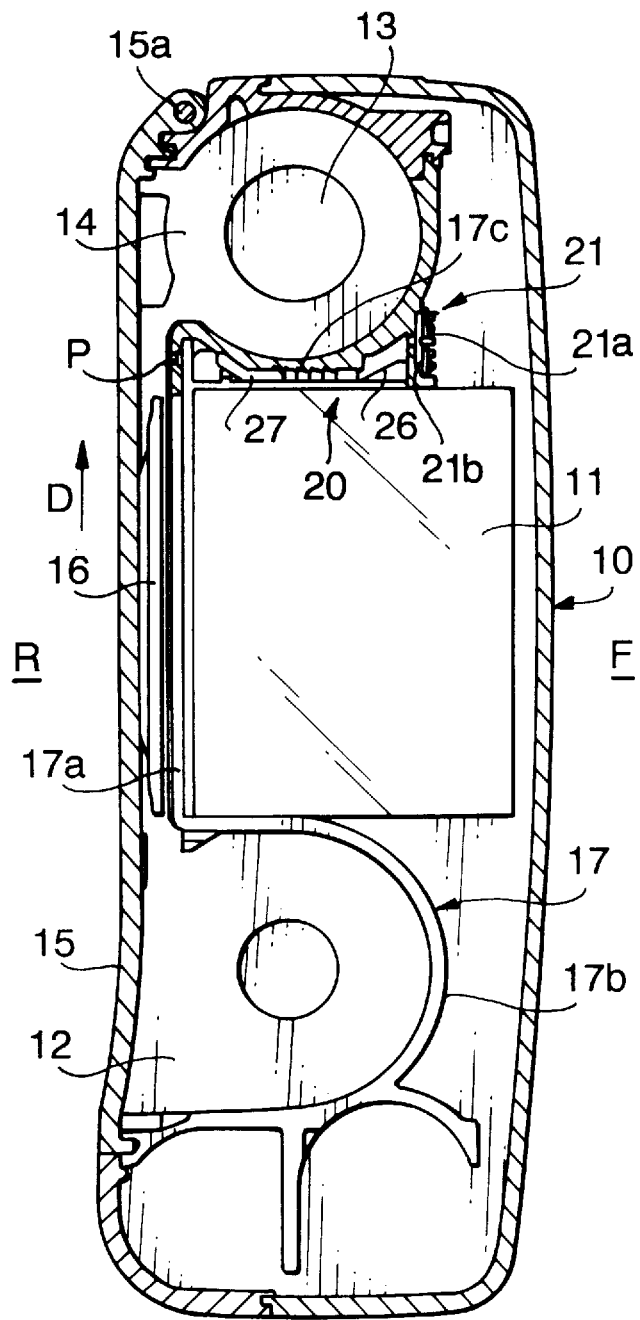
FIG. 1 is a sectional view of a camera to which a data printing device according to a first embodiment is applied.

Preferred embodiments of a data printing device of the present invention are described as applied to a compact type camera. FIG. 1 shows the general arrangement of the camera. In the following description, a front side F is defined as a side of an object to be photographed (right hand side in FIG. 1) and a rear side R is defined as opposite to the front side F (left hand side in FIG. 1).

The camera includes a camera body 10 and a back lid 15 that can rotate about a rotation axis 15a in order to close an opening at the rear side R of the camera body 10.

Formed within the camera body 10 are a lens space 11, where a zoom lens barrel (not shown) is installed (shown as a rectangular area in FIG. 1), a cartridge chamber 12, in which a film cartridge (not shown) is set, and a spool chamber 14, where a spool 13 is arranged for winding film (not shown) pulled from the film cartridge. The cartridge chamber 12 and the spool chamber 14 are arranged at the sides of the lens space 11 such that the film is wound in a film winding direction D that is perpendicular to a direction from the front side F to the rear side R of the camera. Further, in order to determine an exposure area of the film, an aperture (not shown) is provided at the rear side R of the lens space 11.

A pressure plate 16 is supported on the inner side of the back lid 15 via a plate spring (not shown). A pair of guide rails 17a, which extend between the cartridge chamber 12 and the spool chamber 14, are formed on a chassis 17, at the outside of the aperture, opposite to the pressure plate 16 (i.e., to the rear side R of the lens space 11). The film is pushed against the guide rails 17a by the pressure plate 16. The film is fed such that a frame of the film is positioned at the rear side R of the aperture to be exposed and is then wound in the film winding direction D as the spool 13 rotates. The chassis 17 also includes a first cylindrical wall 17b that forms the cartridge chamber 12 and second cylindrical wall 17c that forms the spool chamber 14.

Figure 2:
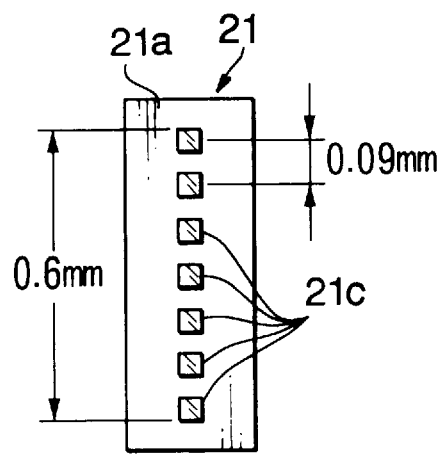
FIG. 2 is a schematic view showing the arrangement of the light emitting points on the light emitting device.
Figure 3:
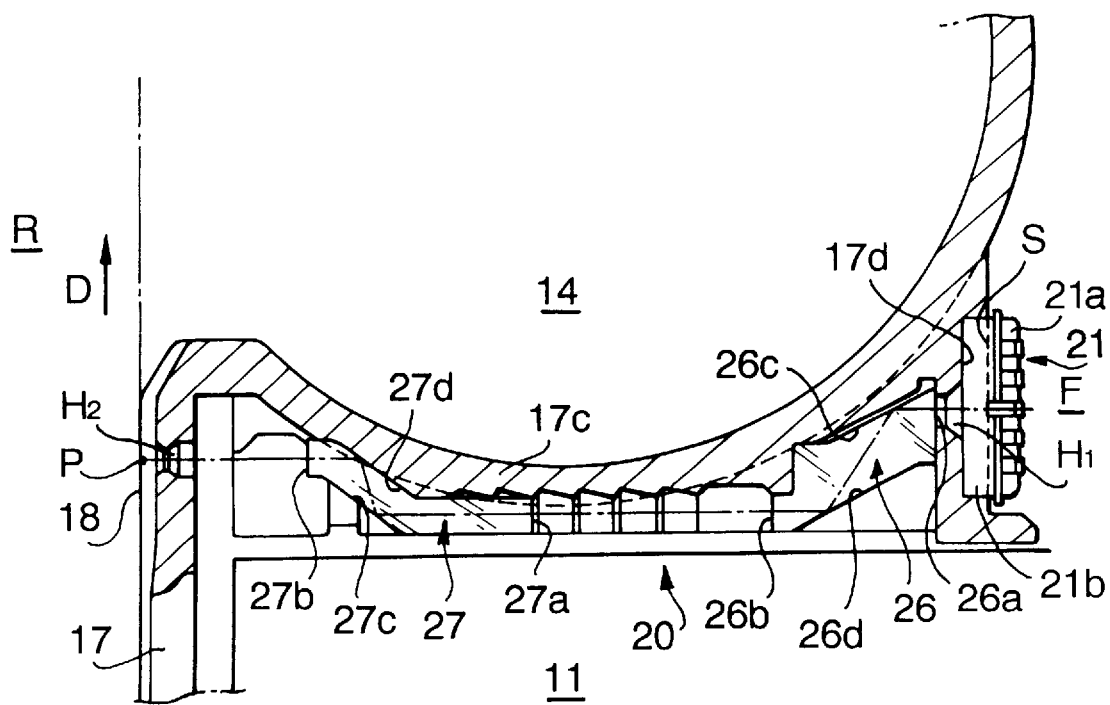
FIG. 3 is an enlarged view of the data printing device according to the first embodiment.

A data printing device 20 is arranged between the lens space 11 and the spool chamber 14. The data printing device 20 includes a light emitting device 21 and an imaging optical system that includes first and second imaging lenses 26 and 27. As shown in FIGS. 2 and 3, the light emitting device 21 includes a light emitting diode 21a that includes a plurality of light emitting points (or elements) 21c on a single substrate and a cover glass 21b that covers a light emitting surface S (see FIG. 3) of the light emitting diode 21a.

The light from each of the light emitting points 21c is imaged on the film by the imaging lenses 26 and 27 to form corresponding light points at the film surface. The light emitting diode 21a includes, in this example, seven light emitting points 21c as shown in FIG. 2. The light emitting points 21c are aligned along a straight line, and the alignment direction is the same as that of the corresponding light points on the film. The alignment direction is perpendicular to the film winding direction D, i.e., perpendicular to the sheet of FIG. 1.

The light emitting device 21 is controlled such that each of the light emitting points 21c emits light according to predetermined data and in synchronism with the film winding in order to print character data on the film as a dot matrix image.

In this embodiment, the distance between adjacent light emitting points 21c is 0.09 mm and the total distance between the light emitting points 21c at the ends is 0.6 mm as shown in FIG. 2. Due to the size of each frame of film, typically the size of characters (letters) of the printed data is limited within a range of about 0.4–0.7 mm in a direction perpendicular to the winding direction D and thus, in the embodiments, the imaging optical system forms an approximately full-size image of the series of the light emitting points on the film, i.e., the magnification of the imaging optical system is nearly equal to 1.

The printing position P is located at a point between the aperture and the spool chamber 14, that is, downstream of the photographing (exposure) position along the film winding direction D, and the data is printed on the exposed frame after exposure (photographing), i.e., the date is printed during the film winding, after a shutter is released.

The position of the data printing device 20 of the embodiment is based on the assumption that the film is wound from the film cartridge after the exposure of each frame. However, the data printing device 20 of the embodiment is also effective for a "pre-loading" type camera in which film is first wound by a spool at the time when the film is set and the film is then rewound into a film cartridge after the exposure of each frame. In such a "pre-loading" type camera, the data printing device 20 could be positioned between the lens space 11 and the cartridge chamber 12. In this specification, the term "wind" describes the transfer of the film by a frame after each exposure (photographing operation).

Figure 4:
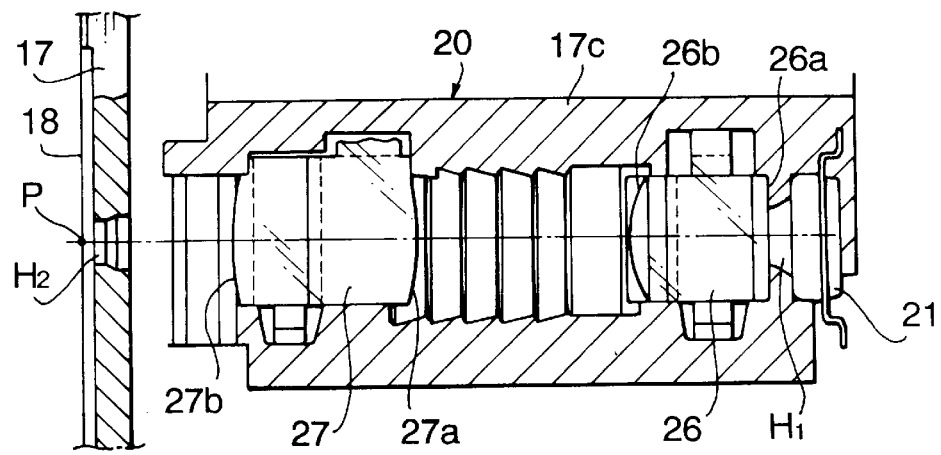
FIG. 4 is a sectional view of the data printing device according to the first embodiment.

FIG. 3 is an enlarged view of FIG. 1 showing the data printing device 20 of the first embodiment and FIG. 4 is a sectional view of the data printing device 20 of the first embodiment in a plane perpendicular to the film winding direction D as viewed from the lens space 11 side.

As is shown in FIGS. 3 and 4, the data printing device 20 is provided between a side wall 11a of the lens space 11 and a cylindrical wall 17c of the chassis 17. The light emitting device 21 is engaged in a step portion 17d formed on the cylindrical wall 17c and the first imaging lens 26 and the second imaging lens 27 are supported by appropriate formation of either of the cylindrical wall 17c or the side wall 11a. Preferably, as is shown in FIGS. 3 and 4 but not described in detail herein, the cylindrical wall 17c and the side wall 11a are formed such that the space between the first imaging lens 26 and the second imaging lens 27 is designed to limit the production of extraneous reflections ("ghost light").

The light from the light emitting device 21 passes through a first optical path hole Hi formed on the step portion 17d and is incident into the first imaging lens 26.

The first imaging lens 26 includes two total internal reflecting surfaces 26c and 26d between an incident side surface 26a and an exit side surface 26b to shift in parallel the light path in a direction opposite to the film winding direction D. The exit side surface 26b of the first imaging lens 26 and an incident side surface 27a of the second imaging lens 27 are aligned with each other with respect to the film winding direction D. Light exiting from the first imaging lens 26 passes through a narrow clearance between the lens space 11 and the spool chamber 14 and enters the second imaging lens 27. The second imaging lens 27 includes two total internal reflecting surfaces 27c and 27d between the incident side surface 27a and an exit side surface 27b to shift in parallel the light path toward the film winding direction D. The outgoing light from the second imaging lens 27 is transmitted through a second optical path hole H2 formed on the chassis 17 to form an image at the printing position P on the film 18.

On the basis of the above-mentioned construction, the optical path is shifted in parallel toward the side of the lens space 11 by the two reflecting surfaces 26c and 26d, and then the optical path is again shifted in parallel toward the side of the spool chamber 14 by the two reflecting surfaces 27d and 27d.

Since the optical path is bent around an arc of the second cylindrical wall 17c by the reflecting surfaces 26c, 26d, 27c and 27d, the location of the light emitting device 21 and the printing position P can be freely determined, such that the spool chamber 14 can be arranged close to the lens space 11. Thus, the size of the camera in the film winding direction D can be reduced and the camera can be made more compact.

That is, since the light emitting device 21 has a predetermined width in the film winding direction D, the light emitting points of the device 21 must be spaced from the lens space 11 so that the light emitting device 21 does not interfere with the optical path for photographing. Also, if the optical path between the light emitting device 21 and the printing point P is straight, the clearance between the lens space 11 and the second cylindrical wall 17c must be larger so that the light from the light emitting device 21 is not interrupted by the second cylindrical wall 17c. Thus, the data printing device 20 of the present embodiment provides a smaller camera in the film winding direction D.

On the other hand, if only the two reflecting surfaces 26c and 26d are provided, such that light that exits from the first imaging lens 26 is transmitted straight to the film 18 through the clearance between the lens space 11 and the second cylindrical wall 17c, the printing point P cannot be selected as freely and the chassis 17 may be weaker since the optical path hole H2 for data printing and the aperture for photographing will be formed with only a slight separation therebetween.

In the embodiments, the reflecting surfaces 26c, 26d, 27c, 27d in the lenses 26, 27 are formed as total internal reflecting surfaces so that it is easy to locate the reflecting surfaces 26c, 26d, 27c, 27d in relation to the refractive surfaces (the incident and exit surfaces) and in order to reduce the cost of the optical system as compared with an optical system using vapor deposition formed mirrors or the like. However, the reflecting surfaces 26c, 26d, 27c, 27d are not limited to total internal reflecting surfaces and, for example, evaporated mirrors or the like can be used. Additionally, each pair of total internal reflecting surfaces is formed in a single piece lens so that the reflecting surfaces in the pair can be kept parallel and the direction of the exit light will not be affected even if the imaging lens is slightly rotated.

Figure 5:
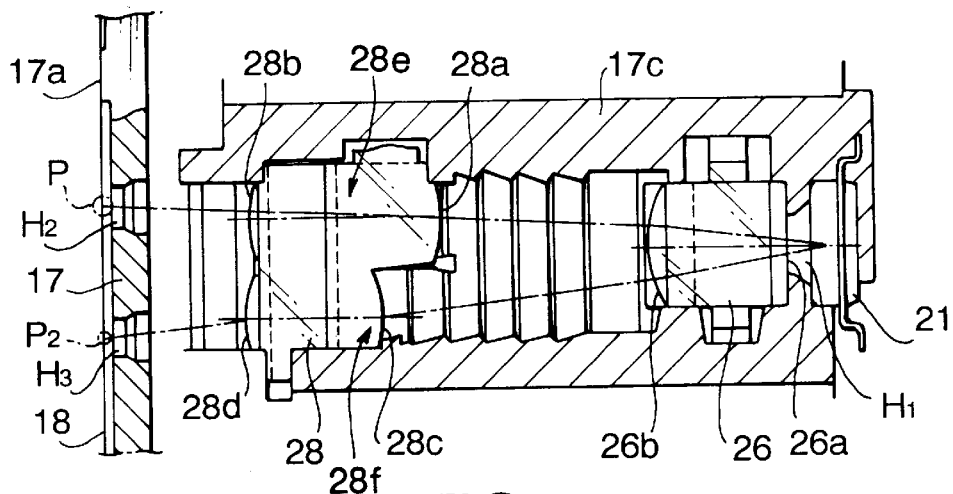
FIG. 5 is a sectional view of a data printing device according to a second embodiment.

FIG. 5 is a sectional view of a second embodiment, viewed in a plane that is perpendicular to the film winding direction D (see FIG. 1). The second embodiment is directed to a camera that includes a normal photographing mode and a panoramic photographing mode.

In this type of camera, an exposure area of a frame taken in the panoramic photographing mode is generally narrower than that in the normal photographing mode in the direction of the width of the film, i.e., in a direction perpendicular to the winding direction D. Due to this and other differences in frame size between pictures taken in panoramic photographing mode and in normal mode, during development, a frame taken in the panoramic photographing mode is enlarged at a higher magnification than the magnification used for frames taken in the normal photographing mode.

Due to this difference in frame size and in development magnification, the data printing position and size should also be different for each of the photographing modes. In the second embodiment, a second imaging lens 28 that has two different lens functions is used in place of the second imaging lens 27 of the first embodiment. As shown in FIG. 5, the second imaging lens 28 includes an upper portion 28e ("upper" in the view of FIG. 5) and a lower portion 28f. The upper portion 28e includes a first incident side surface 28a and a first exit side surface 28b and has the same function as the second imaging lens 27 in the first embodiment. The upper portion 28e is used for printing data on a frame of film taken in the normal photographing mode. The lower portion 28f includes a second incident side surface 28c and a second exit side surface 28d and is used for printing data on a frame taken in the panoramic photographing mode. The magnification of each of the upper portion 28e and the lower portion 28f of the second imaging lens 28 is determined so that the characters of printed data have a predetermined identical size after development to a predetermined size of print.

The shape of the second imaging lens 28 in a plane that is perpendicular to the film 18 and parallel to the film winding direction D is essentially identical with the shape of the second imaging lens 27 viewed in the same plane as shown in FIG. 3. That is, the second imaging lens 28 is also provided with two total internal reflecting surfaces (not shown) that are parallel to each other and that reflect the light that enters into both the upper portion 28e and the lower portion 28f of the second imaging lens 28.

In this embodiment, a part of the light emitted from the light emitting device 21 and transmitted through the first imaging lens 26 enters the first incident side surface 28a of the second imaging lens 28. The incident light from the first incident side surface 28a is reflected by the reflecting surfaces in the second imaging lens 28 and exits from the first exit side surface 28b. In the same manner, the other part of the light transmitted through the first imaging lens 26 enters the second incident side surface 28c of the second imaging lens 28 and exits from the second exit side surface 28d.

Further, in this embodiment, the chassis 17 is provided with both a second optical path hole H2 and a third optical path hole H3. The outgoing light from the first exit side surface 28b is transmitted through the second optical path hole H2 to print data at a normal printing position P on the film 18. The outgoing light from the second exit side surface 28d is transmitted through the third optical path hole H3 to print data at a panoramic printing position P2 on the film 18.

The camera of the second embodiment further includes a pair of light interrupting plates (not shown) at the aperture behind the lens space 11. The light interrupting plates are arranged to shade the upper and lower sides of the aperture in the width direction of the film 18 when the camera is used in panoramic photographing mode. In this embodiment, one of the light interrupting plates also shields a selected one of the second and third optical path holes H2 and H3 corresponding to the photographing mode. When the camera is set in the normal photographing mode, the light interrupting plates are set outside of the aperture and arranged to shield the third optical path hole H3. On the other hand, when the camera is set in the panoramic photographing mode, the light interrupting plates are set inside the aperture to shade the sides of the aperture and shield the second optical path hole H2.

Figure 6A:
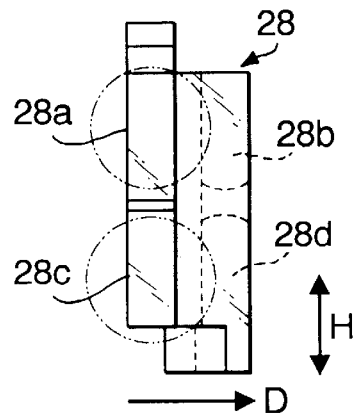
FIG. 6(a) is a front view of a second imaging lens in the data printing device according to the second embodiment.
Figure 6B:
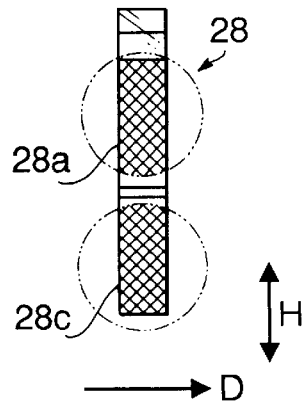
FIG. 6(b) is a front view of the incident side surfaces of the second imaging lens.

FIGS. 6(a) and 6(b) show the shape of the second imaging lens 28 as viewed from the first imaging lens 26. In FIGS. 6(a) and 6(b) an alignment direction H is defined as the direction in which the light emitting points 21c of the light emitting diode 21 are aligned. The alignment direction H is perpendicular to the film winding direction D. As is shown in FIG. 5, the second imaging lens 28 is formed to have a rectangular shape in a plane perpendicular to the light path from the light emitting device 21. That is, the length of the second imaging lens 28 in the alignment direction H is longer than that in the film winding direction D. FIG. 6(a) shows a view of the second imaging lens 28 as viewed from the first imaging lens 26. The first and second incident side surfaces 28a and 28c and the first and second exit side surfaces 28b and 28d are formed to have rectangular shapes of which the long sides are parallel to the alignment direction H. FIG. 6(b) shows only the first and second incident side surfaces 28a and 28c of the second imaging lens 28 and the lens portions having a lens function are indicated by meshed lines.

The rectangular shape of the second imaging lens 28 described above is necessary since the light emitting points 21c are aligned along the alignment direction H and the lens portions of the second imaging lens 28 must be long enough in the alignment direction H to accommodate the length of the light emitting points 21c in the alignment direction H. However, in the film winding direction D, the second imaging lens 28 need only be wide enough to transmit at least the center portion of the light for forming a light point on the film.

Similar considerations apply to the formation of the first imaging lens 26 in both embodiments and the second imaging lens 27 of the first embodiment, which are also formed having rectangular shapes with longer sides in the direction parallel to the alignment direction H.

In particular, it is preferable that the shape of an incident or exit side surface in a plane perpendicular to an optical axis of the imaging optical system satisfy the following condition, $$0.3 < Ld/Lh < 1.0,$$

where Lh is a length in the alignment direction H and Ld is a length in a direction perpendicular to the alignment direction, i.e., in the film winding direction D. When the above condition is satisfied, the lens size in the film winding direction is minimized. However, if Ld/Lh is smaller than 0.3, astigmatism may be larger than an allowable range and the shape of the light point on the film may be affected. Further, if Ld/Lh is larger than 1.0, the size of the camera in the film winding direction is too large, similar to conventional cameras.

Specific numerical examples for each of the embodiments are described in Tables 1 and 2. Table 1 shows values for an imaging optical system for a normal photographing mode. That is, the table 1 represents the imaging optical system comprising the first imaging lens 26 and the second imaging lens 27 of the first embodiment or the system comprising the first imaging lens 26 and the upper portion 28e of the second imaging lens 28 of the second embodiment. Table 2 shows values for an imaging optical system for a panoramic photographing mode, i.e., the imaging optical system comprising the first imaging lens 26 and the lower portion 28f of the second imaging lens 28 of the second embodiment.

In the tables, m denotes a magnification, r denotes a radius of curvature of a surface (the values at the vertex for an aspherical surface), d denotes a distance between surfaces along the optical axis, nd denotes the refractive index at a wavelength of 588 nm and νd denotes an Abbe number.

In Tables 1 and 2, the surface number 1 represents the light emitting surface S of the light emitting diode 21a and the surface numbers 2 represents the exit side surface of the cover glass 21b. The distance between the surface numbers 1 and 2 represents the thickness of the cover glass 21b, the surface number 3 represents the incident side surface 26a of the first imaging lens 26, the surface number 4 represents the exit side surface 26b of the first imaging lens 26 and the surface number 7 represents the film 18.

In Table 1, the surface number 5 represents the incident side surface 27a of the second imaging lens 27 or the first incident side surface 28a of the second imaging lens 28 and the surface number 6 represents the exit side surface 27b of the second imaging lens 27 or the first exit side surface 28b of the second imaging lens 28. In Table 2, the surface number 5 represents the second incident side surface 28c of the second imaging lens 28 and the surface number 6 represents the second exit side surface 28d of the second imaging lens 28.

The imaging optical system of the embodiments includes two aspherical surfaces in order to provide enough performance (i.e., low aberration) even though only a small number of lenses is used. In these examples, in the first embodiment, both the incident side and exit side surfaces 27a and 27b of the second imaging lens 27 and, in the second embodiment, both the first incident side and first exit side surfaces 28a and 28b of the second imaging lens 28 (fifth and sixth surfaces in Table 1) and both the second incident side and second exit side surfaces 28c and 28d of the second imaging lens 28 (fifth and sixth surfaces in table 2) are formed as rotationally symmetric aspherical surfaces.

An aspherical surface is expressed by the following equation:

$$X = \frac{CY^2}{1+\sqrt{1-(K+1)Y^2C^2}} + A_4Y^4.$$

In particular, X is a SAG, that is, a distance of a curve from a plane, the plane being tangential to the curve at the optical axis, at a point where the height from the optical axis is Y. C is a curvature (1/r) of the top of the surface, K is a conic constant and $A_4$ is an aspherical surface coefficient of fourth order. The constant K and coefficient A4 are shown at the bottom of each table.

[TABLE 1]

m = −1.08

| Surface number | r | d | nd | νd |
|---|---|---|---|---|
| 1 | ∞ | 0.62 | 1.49176 | 57.4 |
| 2 | ∞ | 0.70 | | |
| 3 | ∞ | 6.00 | 1.49176 | 57.4 |
| 4 | −4.200 | 6.39 | | |
| 5 | 3.349 | 7.08 | 1.49176 | 57.4 |
| 6 | −10.724 | 4.57 | | |
| 7 | ∞ | | | |

Aspherical data for the 5th surface: K = 0   $A_4 = -3.037 \times 10^{-3}$
Aspherical data for the 6th surface: K = 0   $A_4 = -7.757 \times 10^{-3}$

[TABLE 2]

m = −0.75

| Surface number | r | d | nd | νd |
|---|---|---|---|---|
| 1 | ∞ | 0.62 | 1.49176 | 57.4 |
| 2 | ∞ | 0.70 | | |
| 3 | ∞ | 6.00 | 1.49176 | 57.4 |
| 4 | −4.200 | 8.24 | | |
| 5 | 3.792 | 5.35 | 1.49176 | 57.4 |
| 6 | −4.561 | 4.45 | | |
| 7 | ∞ | | | |

Aspherical data for the 5th surface: K = 0   $A_4 = -3.241 \times 10^{-3}$
Aspherical data for the 6th surface: K = 0   $A_4 = -6.668 \times 10^{-3}$ According to the present invention, since the optical path of the data printing device is arranged around an arc of a cylindrical wall forming a film space such as a spool chamber or a cartridge chamber, the space occupied by the data printing device is minimized, and thus the camera can be made compact.

The present disclosure relates to subject matter contained in Japanese Patent Application No. HEI 8-87348, filed on Mar. 15, 1996, which is expressly incorporated herein by reference in its entirety.

What is claimed is:

1. A data printing device of a camera for printing a data pattern on a film concurrently with a winding operation of said film, said device comprising:

a light emitting device including a plurality of light emitting elements; and an imaging optical system for forming light points on said film which correspond to said light emitting elements, said imaging optical system including at least one imaging lens and at least three reflecting surfaces that reflect the light from said light emitting device to shift an optical path around an arc of a cylindrical wall, the at least three reflecting surfaces formed as total internal reflecting surfaces.

2. The data printing device according to claim 1, said imaging optical system comprising four reflecting surfaces.

3. The data printing device according to claim 2, said imaging optical system comprising a first imaging lens and a second imaging lens, each of said first imaging lens and said second imaging lens comprising two of said four reflecting surfaces.

4. The data printing device according to claim 3, wherein said total internal reflecting surfaces in said first imaging lens shift said optical path in one direction and said total internal reflecting surfaces in said second imaging lens shift said optical path in an opposite direction.

5. The data printing device according to claim 1, wherein said cylindrical wall forms a part of a film space for storing film.

6. The data printing device according to claim 5, wherein said film space comprises a spool chamber onto which said film is wound.

7. The data printing device according to claim 1, said imaging optical system comprising a first imaging lens adjacent to said light emitting device and a second imaging lens adjacent to said film.

8. The data printing device according to claim 7, said first imaging lens comprising a first pair of said at least three reflecting surfaces, said first pair of reflecting surfaces being parallel to each other.

9. The data printing device according to claim 8, wherein said second imaging lens comprises a second pair of said at least three reflecting surfaces, said second pair of reflecting surfaces being parallel to each other.

10. The data printing device according to claim 9, wherein an exit side surface of said first imaging lens is aligned with an incident side surface of said second imaging lens.

11. The data printing device according to claim 10, wherein said two total internal reflecting surfaces in said first imaging lens shifts said optical path in one direction and said two total internal reflecting surfaces in said second imaging lens shifts said optical path in an opposite direction.

12. The data printing device according to claim 7, wherein incident side surfaces and exit side surfaces of said first and second imaging lenses are formed having a rectangular shape in a plane perpendicular to an optical axis of said imaging optical system.

13. The data printing device according to claim 12, wherein said rectangular shape of said incident side surfaces and said exit side surfaces of said first and second imaging lenses satisfies the following condition, $$0.3 < Ld/Lh < 1.0,$$

where Lh is a length of said rectangular shape in a direction parallel to an alignment direction of said light emitting points and Ld is a length of said rectangular shape in a direction perpendicular to said alignment direction.

14. The data printing device according to claim 7, said second imaging lens comprising a first lens portion for a normal photographing mode and a second lens portion for a panoramic photographing mode.

15. The data printing device according to claim 14, wherein said first lens portion has larger degree of magnification than said second lens portion.

16. The data printing device according to claim 1 wherein two of the at least three reflecting surfaces are formed in parallel to each other.

17. The data printing device according to claim 1 wherein the at least one imaging lens is formed with at least two of the at least three reflecting surfaces.

* * * * *